United States Patent [19]

Collas et al.

[11] Patent Number: 4,937,971

[45] Date of Patent: Jul. 3, 1990

[54] PROCESS OF GRAFTED CUTTINGS OF STOCK AND SCION FROM IN VITRO

[75] Inventors: Alain Collas, Verzenay; Olivier Brun, Tours Sur Marne; Claude Martin; Roland Vernoy, both of Saulon La Chapelle; Georges Vesselle, Tours Sur Marne, all of France

[73] Assignees: Groupement Champenois d'Exploitation Viticole, Epernay, France; Institut National de la Recherche Agronamique, Paris, France

[21] Appl. No.: 414,571

[22] Filed: Sep. 29, 1989

Related U.S. Application Data

[63] Continuation of Ser. No. 175,034, Mar. 29, 1988, abandoned.

[30] Foreign Application Priority Data

Apr. 8, 1987 [FR] France .................. 87 04968

[51] Int. Cl.$^5$ ............................................. A01G 1/06
[52] U.S. Cl. ............................................. 47/58; 47/6
[58] Field of Search .................. 47/6, 7, 58, DIG. 3

[56] References Cited

U.S. PATENT DOCUMENTS

| | | | |
|---|---|---|---|
| 2,764,844 | 10/1956 | Young | 47/6 |
| 3,500,582 | 3/1970 | Hyde | 47/6 |
| 3,513,593 | 5/1970 | Beck | 47/87 |
| 4,532,733 | 8/1985 | Krul | 47/58 |
| 4,569,914 | 2/1986 | Molnár et al. | 47/DIG. 3 |
| 4,586,288 | 5/1986 | Walton | 47/73 |
| 4,769,944 | 9/1988 | Fresne et al. | 47/6 |
| 4,803,803 | 2/1989 | Moffet | 47/DIG. 3 |

FOREIGN PATENT DOCUMENTS

| | | | |
|---|---|---|---|
| 2388485 | 11/1978 | France | 47/6 |
| 2537157 | 6/1984 | France | 47/6 |
| 8601117 | 8/1987 | France | 47/6 |
| 0597360 | 3/1978 | U.S.S.R. | 47/DIG. 3 |
| 619147 | 8/1978 | U.S.S.R. | 47/6 |
| 0733561 | 5/1980 | U.S.S.R. | 47/DIG. 3 |
| 895363 | 1/1982 | U.S.S.R. | 47/6 |

OTHER PUBLICATIONS

Hartmann, H. T. et al. (2nd ed., 1968) "Herbaceous Grafting", Plant Propagation, Prentice-Hall, Inc., Englewood Cliffs, NJ, pp. 447–448.

Primary Examiner—James R. Feyrer
Attorney, Agent, or Firm—Sandler, Greenblum & Bernstein

[57] ABSTRACT

Starting from a herbaceous cutting, which may be derived from in vitro culture, of stock and of a herbaceous scion, the process consists of inserting the scion (12') having a single bud, into the stock cutting (12), by bevelling the lower end 15 of the scion 12' from two sides 17, 18, by slitting the upper end of the stock cutting in its middle, and by subsequently assembling the two parts 12, 12' by joining 20, of transferring the base of the abovementioned grafted unit into a development medium 21, of moistening the development medium 21 with a nutrient solution and of subsequently placing this unit in a container with a water-saturated atmosphere and at a temperature above 20° C., while suppressing the bud 22 of the stock and growing the saplings in the greenhouse or under a polyethylene tunnel until the desired stage of growth.

21 Claims, 3 Drawing Sheets

PROCESS OF GRAFTED CUTTINGS OF STOCK AND SCION FROM IN VITRO

This application is a continuation, of application Ser. No. 175,034, filed Mar. 29, 1988 now abandoned.

BACKGROUND OF THE INVENTION

1. Field of the Invention

The present invention relates to a process for the production of grafted saplings of ligneous or semi-ligneous plants, and more especially of vine, and to the saplings obtained.

2. Discussion of Background and Material Information

The phylloxera appeared in France in 1866 and destroyed the vineyards completely in 1914. Their restoration could only be ensured by starting grafting French vine-plants onto American varieties or hybrids resistant to the insect. This grafting consists of joining the stock which will be buried and which will grow roots to the scion which will form the above-ground part and which will bear grapes.

Up to date, the method used is approximately the same as the one which was used for restoring French vineyards. Grafting is carried out on mature material at the end of winter by joining a shoot of American stock having a length of 20 to 30 cm to a scion of 4 to 5 cm which has one bud, of a variety of *Vitis vinifera*. The unit is then subjected to stratification in order to produce a join callus at the point of grafting. 15 to 21 days later the graftings are planted either in the greenhouse or in the field in order to promote root production, while the bud of the scion starts to grow in the course of these operations. This traditional grafting technique gives grafted plants ready for planting in 6 or 12 months, but with fairly low success rates, in the order of 30-35%.

The development of novel technologies, in particular IN VITRO culture, for the production of vine saplings has led to a study of novel grafting techniques.

Vegetative IN VITRO multiplication has enabled the said method of grafting of green wood to be put into practice. This technique has two major disadvantages:
grafting being being carried out on a rooted stock, it is necessary to produce all the stock required in the production by IN VITRO methods,
the 7 or 8 eyes at the base of the stock, whose development would inhibit that of the scion, have to be removed, which is a tricky, lengthy and onerous task.

FR-A-86 01, 117 discloses a machine for grafting of green wood.

SUMMARY OF THE INVENTION

The object of the present invention is a process for the production of grafted saplings of ligneous or semi-ligneous plants in order to obtain saplings, in particular of grape vine, with the view of obtaining saplings ready for planting in a shorter period after grafting, having a success rate that has not been reached to date, and of superior quality.

The technique according to the present invention is the grafting on herbaceous cuttings.

More particularly, the present invention relates to a process for grafting ligneous or semi-ligneous plants in order to obtain saplings, comprising a combination of the steps, consisting of:

(a) growing at least one young stock sapling and at least one young scion sapling, both derived from IN VITRO culture, in the greenhouse or under a polyethylene tunnel for a period long enough to obtain herbaceous branches with internodes of sufficient length;

(b) taking cuttings of stock and scions on the saplings obtained in step (a) above;

(c) inserting a scion containing a single bud into a stock cutting by bevelling the lower end of the scion from two sides, by slitting the upper end of the stock cutting in the middle and then by assembling the two parts by joining;

(d) transferring said grafted unit according to (c) above into a development medium which is moistened with a nutrient solution;

(e) placing the unit according to (d) above into a container having a water-saturated atmosphere, at a temperature above 20° C.;

(f) suppressing the bud on the stock;

(g) growing the saplings in the greenhouse or under a polyethylene tunnel until they have reached the desired stage of growth.

A more preferred aspect of the invention relates to a method of concomitantly rooting and uniting without callosing grafted plants which are in an actively growing condition comprising the steps of:

A. selecting a rootstock line and IN VITRO culturing such line to a state of being differentiated tender tissue in the form of shoots, said shoots being of a size wherein such shoots can be conveniently manipulated by hand and in an actively elongating growth stage;

B. selecting a scion line and In Vitro culturing such line to state of being differentiated tender tissue in the form of shoots, said shoots being of a size wherein such shoots can be conveniently manipulated by hand and being in an actively elongating growth stage;

C. dividing the stock shoots into at least one section, wherein each section includes at least one node bearing at least one leaf;

D. dividing the scion shoots into at least one section, wherein each section includes at least one node bearing at least one leaf;

E. grafting said scion shoot section onto said stock section to form graft unions;

F. embedding at least the lower portion of the length of said stock section into a rooting medium;

G. maintaining the embedded graft unions in conditions of temperature, humidity and root growth conditions, which assure that the grafted sections will remain in an active stage of growth for a period of at least about 10 days; and H. hardening said grafted plants for ultimate transplanting.

The present invention relates also to the individual features described below and to all their combinations which are technically possible:
the young scion sapling is a variety of Vitis vinifera;
the culture of the young stock saplings and scion saplings is carried out in the greenhouse or under protective cover; two or three months later, it is possible to start taking cuttings;
the herbaceous branches have internodes of a length of approximately 10±2 cm;
the stock cuttings are cut in the lower part below a suppressed eye;
the stock cuttings are cut in the middle part of an internode including the upper eye and also the major part of the following internode;

the lower end of the scion is bevelled from two sides at an angle of 16°±4° while the upper end of the stock cutting is split in the middle over a length of 5 to 10 mm, and the two parts are assembled by joining them;

the development medium of the grafted unit is a cube of rock wool;

joining of the scion and of the stock cutting can be carried out by different processes, such as saddle grafting, omega grafting, splice grafting or any other process of assembly;

the development medium of the grafted unit is a pot containing a mixture of peat and pozzolana or any other culture substrate;

the nutrient solution is chosen among a solution based on calcium nitrate, on potassium nitrate, on magnesium sulfate, on ammonium nitrate, on potassium hydrogenphosphate, on iron citrate and on a mixture of several trace elements;

the container is at a temperature in the range from 20° to 30° C. and a humidity of 90 to 100%;

the stock/scion join corresponds to root production and appears after approximately 10 days.

BRIEF DESCRIPTION OF THE DRAWINGS

Various advantages and features of the present invention will become obvious from the following detailed description made with reference to the attached drawings in which.

DETAILED DESCRIPTION

Figure 1:
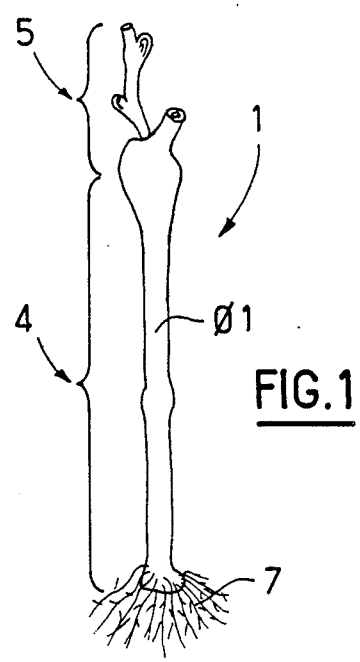
FIGS. 1 and 1A illustrate a grafted sapling of the prior art according to the traditional method.
Figure 1A:
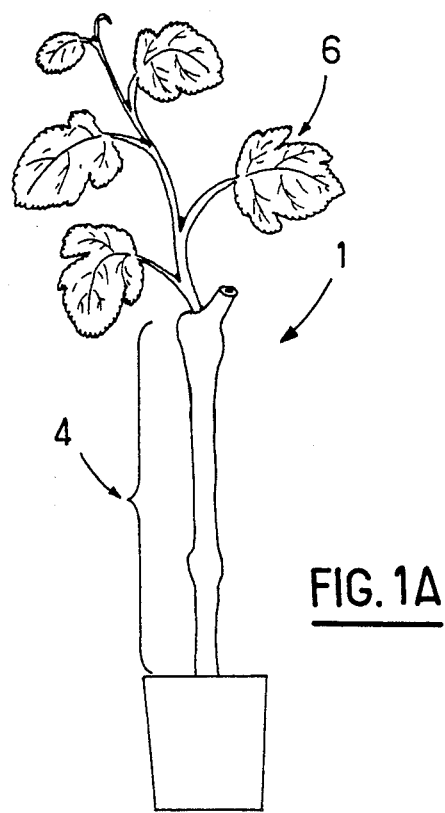

In FIGS. 1 and 1A, the traditional sapling is denoted by 1, it comprises a stock 4 and a scion 5, the roots being represented by 7. The length of such a sapling 1 is between 25 and 30 cm, its diameter $\phi_1$ is 6 to 14 mm, its roots 7 are scarcely developed (only some roots), the internode length is approximately 10 cm, and the join of stock 4 and scion 5 is thick and often exhibits necrotic parts. The sapling according to FIG. 1 is a sapling in the phase of dormancy, while that of FIG. 1A is a sapling in its growth phase, the leaves of the scion having the reference number 6.

Figure 2:
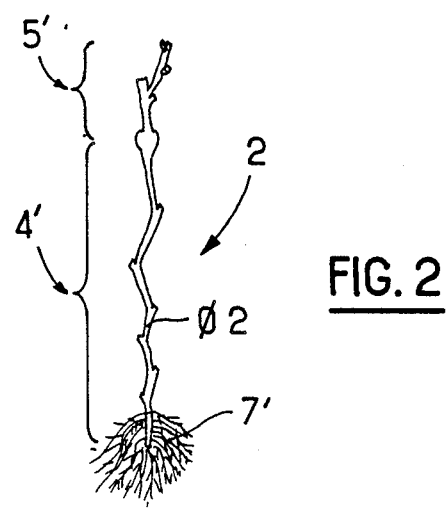
FIGS. 2 and 2A illustrate a grafted plant of the prior art, derived from IN VITRO culture, and obtained by grafting onto a stock sapling.
Figure 2A:
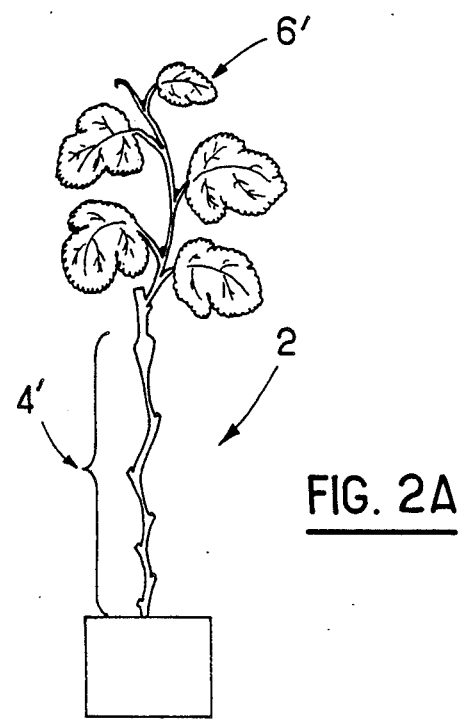

FIGS. 2 and 2A, the grafted sapling derived from IN VITRO culture and obtained by grafting on a stock plant or grafting on green wood is denoted by 2, it comprises a stock 4' and a scion 5', the roots being denoted by 7'. The length of such a sapling 2 is between 15 and 30 cm, its diameter $\phi_2$ is from 1.5 to 5 mm, its roots 7' are hairy and large, internode length is very variable and sensibly between 2 and 5 cm, and the stock 4'/scion 5' join is a simple swelling. The sapling according to FIG. 2 is a sapling in the phase of dormancy, while that of the FIG. 2A is a sapling in its growth phase, the leaves of the scion having the reference number 6'.

Figures 3, 3A:
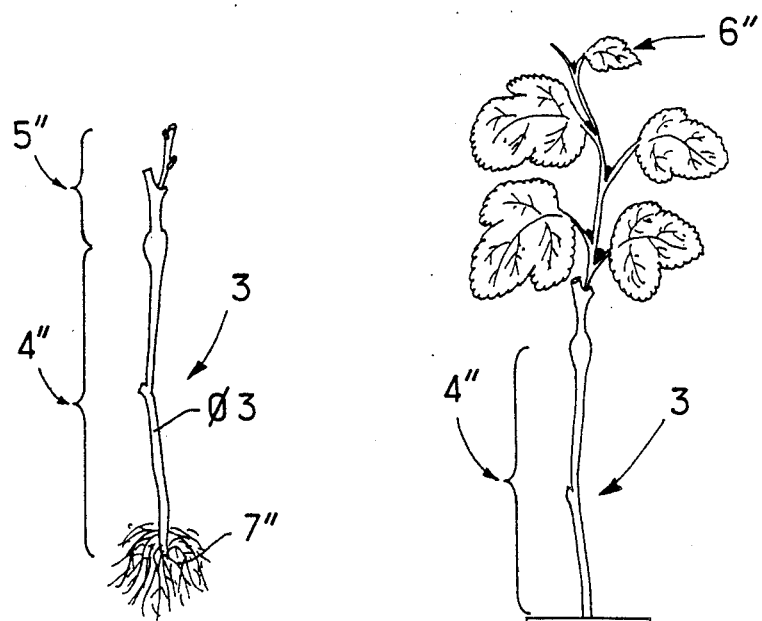
FIGS. 3 and 3A illustrate a grafted sapling, derviced from IN VITRO culture, and obtained by grafting onto a stock cutting according to the present invention.

In FIGS. 3 and 3A, the grafted sapling according to the invention derived from IN VITRO culture and obtained by grafting onto a stock cutting, is denoted by 3. It comprises a stock 4" and a scion 5", the roots being denoted by 7". The length of the sapling 3 is between 15 and 30 cm, its diameter $\phi_3$ is from 3 to 5 mm, its roots 7" are hairy and large, internode length is 10±2 cm, the stock 4"/scion 5" join is in the future assimilated with the plant. The sapling in FIG. 3 is a sapling in the phase of dormancy, while that of FIG. 4 is a sapling in its growth phase, 6" denoting the leaves of the scion.

Figure 4:
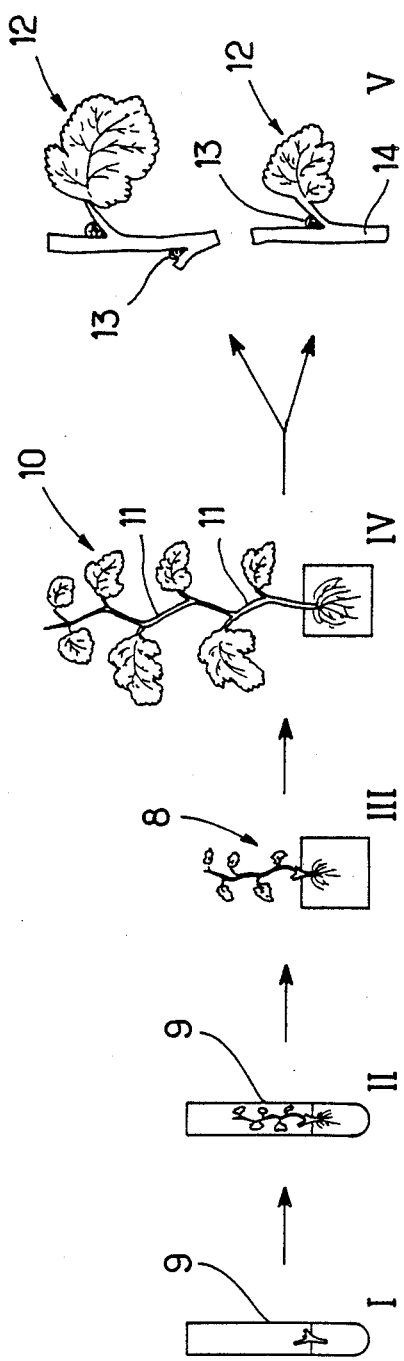
FIG. 4 illustrates the steps of the production of a stock cutting.
Figure 5:
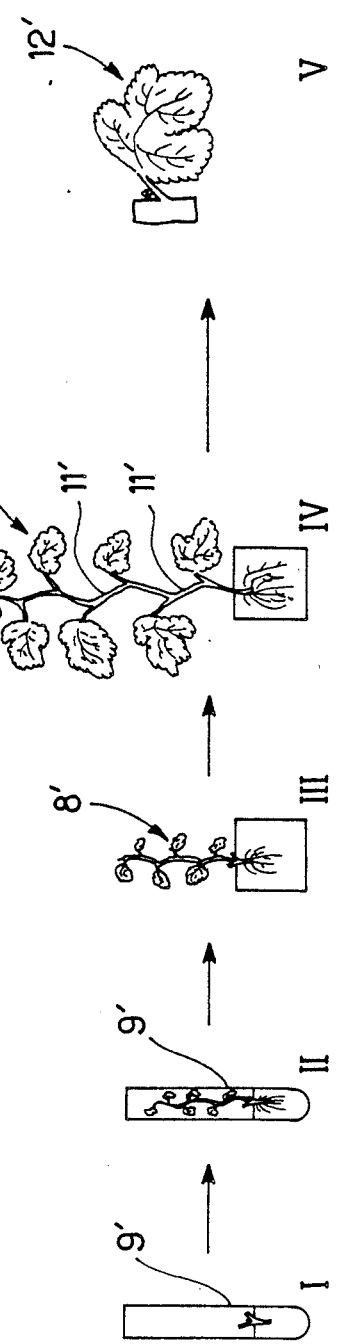
FIG. 5 illustrates the steps of the production of a scion.

FIGS. 4 and 5 show the different steps for obtaining a cutting of stock 12 and of scion 12', respectively. Steps I and II in these figures corresponds to the IN VITRO culture 9, 9' for obtaining young saplings of stock and of scion. Step III shows the young saplings of stock 8 and of scion 8'. They have been grown in the greenhouse or in a polyethylene tunnel, when the temperature conditions permit this. Within 2 or 3 months, herbaceous branches of stock 10 and herbaceous branches of scion 10' are obtained, according to step IV, with internodes 11, 11', respectively, having a length of 10±2 cm. According to step IV, stock cuttings 12 are taken from the stock saplings, the basal part of which is cut either just below an eye 13 or in the middle part 14 of an internode 11, the stock saplings containing the upper eye 13 as well as the major part of the following internode 11. The stock cutting 12 thus obtained comprises all, or part of an internode 11, an intermediate node with its leaf and its secondary bud, and all, or part of, the upper internode. Scions 12' having a single bud are simultaneously taken from scion saplings according to step IV of FIG. 5.

The success of the cutting/grafting or grafting/cutting operation, is influenced by both the stock 4" and the scion 5" maintaining all, or part of, the leaf each of them carries, respectively; since this is too large, it may be reduced by a third of its surface.

Figure 6:
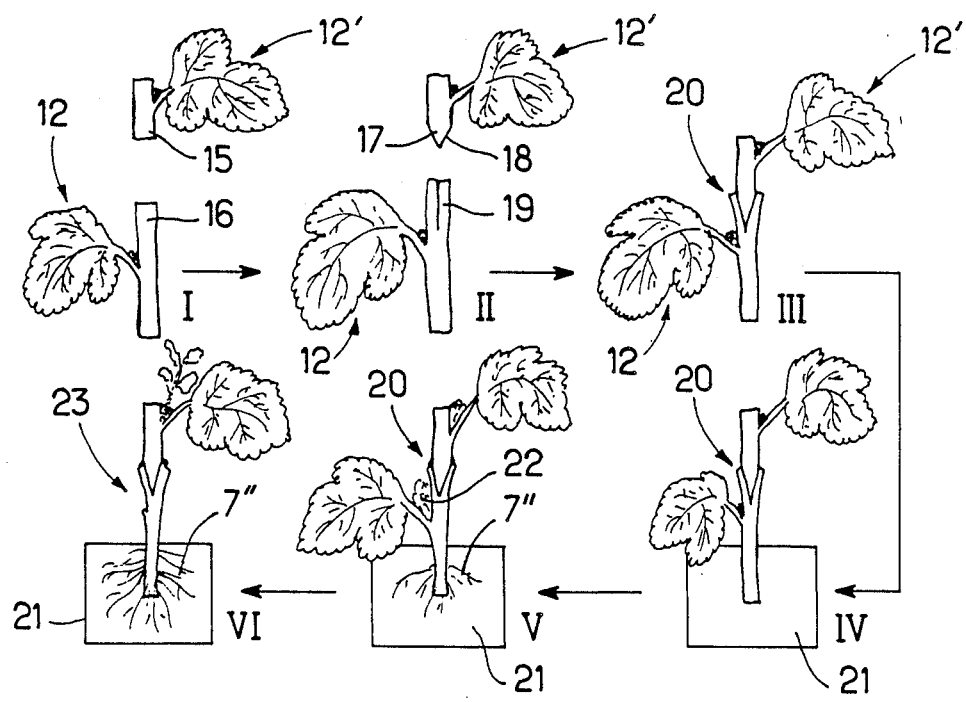
FIG. 6 illustrates the steps of the production of a grafted sapling according to the invention, beginning with a stock cutting and a scion.

The base 15 of the scion 12' is joined to the upper part 16 of the stock cutting 12 either by manual grafting or by mechanical grafting. Whichever method is used, the principle of grafting is the same: the end 15 of scion 12' is bevelled from two sides 17, 18, having an angle of 16°±4°, while the end of the stock cutting 12 is split at 19 in its middle on a length of 5 to 10 mm. These two steps are illustrated in FIG. 6 by I and II. According to steps III of FIG. 6, the two parts 12, 12' are then assembled by joining 20. The base of this unit is then transferred as shown in steps IV of FIG. 6 to a development medium 21. This development medium 12 consists either of a cube of rock wool or of a pot containing a mixture of peat and pozzolana or any other substrate; either of these is moistened with a nutritive solution and then placed into a container under an atmosphere saturated with humidity of approximately 90 to 100% and at a temperature of 20° to 30° C. Various solutions may be used such as, for example, a solution based on calcium nitrate, potassium nitrate, magnesium sulphate, ammonium nitrate, potassium hydrogen phosphate, iron citrate and a mixture of several trace elements. The stock/scion join, as illustrated in steps V and VI in FIG. 6, and the production of roots 7" are simultaneously obtained after approximately 10 days, after which it is very easy to suppress bud 22 of the stock 12, so that its development leaves scion 12' undisturbed. The saplings 23 are thus grown either in the greenhouse or in a polyethylene tunnel. In this manner, it is possible to obtain saplings ready for planting in the vineyard seven weeks after grafting, and with a success rate of 85±5%.

The present invention is described with reference to grafting grape vine saplings, but it can also be applied to the grafting of all the other saplings which are not grape vine saplings but need grafting.

The herbaceous material 10, 10' derived from IN VITRO culture 9, 9' has a certain number of original features which ensure good success of the cutting/grafting or grafting/cutting. It exhibits exceptional rooting ability which is very highly superior to that of young herbaceous shoots taken from a plant grown under natural conditions. This holds true for grape vines but also for Amygdalopersica GF 677, rosebushes, etc. This feature is particularly striking for Amygdalopersica which is known for its weak rooting ability, as far as traditional techniques of vegetative propagation (cuttings, multiplication by layering); starting from IN VITRO-derived material, root formation on young cuttings of more than 90% can be obtained in this plant, and the process can be repeated several times after transferring from the tube before the ability to form roots decreases.

Also, the quality of the join of IN VITRO-derived products from stock 4" and scion 5" depends very much on the physiological age of the two partners and on their state of health. As far as the physiological age is concerned, the microplant derived from IN VITRO culture is undoubtedly a starting material the features of which are very similar to the material derived from seed germination; both are provided with a cambium in the course of formation which, at the molecular level, do not yet exert all the functions which the adult plant will have. Thanks to IN VITRO culture, biological material of stock and of scion is provided which has the same physiological age and, more precisely, which has the features of juvenile plants; the two partners therefore have a better chance of, or less restriction in, amalgamating and allowing a rapid and excellent join which ensures an excellent connection between the vessels of the stock 4" and those of the scion 5". It is important to not that, as IN VITRO culture-derived plants have started the molecular processes which lead to extensive synthesis of phenolic compounds, which can easily be located by the oxidation of the base of the cuttings taken from the middle part of an internode 11, the success of the grafting process decreases considerably, i.e. by 30 to 40%. It is possible to delay this biochemical development in young saplings of grape vine by keeping them at a temperature which is constantly higher than 20° C., more particularly between 20° and 30° C.

The advantages of the process of the present invention are easily understood: first of all, an economic advantages since it is possible to obtain in a very short time a vast number of saplings which can be planted in the vineyard. In the case of traditional grafting, starting from one stock cutting and one scion, 0.35 of a sapling is obtained in six or twelve months. With grafting of immature wood, starting from one stock cutting and one scion cutting, 0.80 of a sapling is obtained in 10 weeks. In contrast, in the process according to the present invention of herbaceous grafting, it is possible to obtain four stock cuttings and and four scions every four weeks, starting from one stock sapling and one scion sapling, yielding 3.2 saplings within seven weeks. Furthermore there is an advantage in the improved quality because grafting is carried out in a herbaceous phase having young cellules having a strong multiplication potential. All these factors permit perfect adherence, without necrosis, as is the case in traditional grafting.

As far as the influence of the state of health on the success of the process is concerned, it also has to be taken into account that meristem culture introduces an additional positive factor with regard to thermotherapy. In point of fact, meristem culture permits the elimination of viruses still unknown because they are only slightly pathogenic, viruses which are not destroyed by thermotherapy itself because the latter is associated with apex culture. Now, multiplication of these obviously restrained viruses is not totally without effect on the development of the plant, which is the more important if two partners are linked, as is the case in grafting; one of the two might contain a virus of very low pathogenicity for itself but which disturbs more deeply the metabolism of the other, resulting in the possibility of the occurrence of an incompatibility of stock/scion which is more or less severe. The process according to the present invention must allow this phenomenon to be restricted.

The process of the invention of herbaceous grafting can be applied to all ligneous or semi-ligneous plants where production demands grafting.

The product obtained by the process according to the present invention is very characteristic because of its diameter, which, for the grape vine, is in the range of 3 to 5 mm, and because the internode length is, for the grape vine, approximately 10 to ±2 cm and, on eventually, the join is assimilated to the plant as shown in FIG. 3, where it is seen that the stock 4"/scion 5" join is neat.

It should be noted that as an example in step (g), the saplings 23 are grown in the greenhouse or under a polyethylene tunnel for approximately seven weeks. Culture of the young saplings of stock and of scion (8,8') in the greenhouse or under protective cover ensures that stock cuttings and scions are obtained during a period which can be continued until the conditions of development are not favourable any longer.

The detection of viral-type diseases of which the pathogens are not characterized yet is carried out by scoring on indicator varieties.

The standard system of producing joined grafts in the nursery, with transplantation into the vineyard, does not permit a definite decision before three years.

Modern techniques of scoring on the immature wood, or IN VITRO on hypocotyl axes of non-rooted seedling have allowed this limit to be shortened to a few weeks after grafting.

The present invention allows the same time limit of response as the modern techniques for combating these diseases, but has the advantage of being more simple and more reliable, hence more economical.

We claim:

1. A process of concomitantly rooting and uniting without callosing grafted plants which are in an actively growing condition, which comprises:
   A. selecting a rootstock line and In Vitro culturing such line to a state of being differentiated tender tissue in the form of shoots, said shoots being of a size wherein such shoots can be conveniently manipulated by hand and in an actively elongating growth stage;
   B. selecting a scion line and In Vitro culturing such line to a state of being differentiated tender tissue in the form of shoots, said shoots being of a size wherein such shoots can be conveniently manipulated by hand and being in an actively elongating growth stage;

C. dividing the stock shoots into at least one section, wherein each section includes at least one node bearing at least one leaf;

D. dividing the scion shoots into at least one section, wherein each section includes at least one node bearing at least one leaf;

E. grafting said scion shoot section onto said stock section to form graft unions;

F. embedding at least the lower portion of the length of said stock section into a rooting medium;

G. maintaining the embedded graft unions in conditions of temperature, humidity and root growth conditions, which assure that the grafted sections will remain in an active stage of growth for a period of at least about 10 days; and H. hardening said grafted plants for ultimate transplanting.

2. The process according to claim 1, wherein said scion sapling is a variety of *Vitis vinifera*.

3. The process according to claim 1 wherein internodes have a length of approximately 10±2 cm.

4. The process according to claim 1 comprising cutting stock shoots at a lower part of an internode beneath an eye of said rootstock line.

5. A process according to claim 1 comprising cutting stock shoots at a first location intermediate two nodes and at a second location to include at least the next lower internode to render a stock section with a node in the upper portion thereof.

6. The process according to claim 1 wherein said cutting comprises beveling said lower end of the scion cutting at an angle of 16°±4°, and splitting an upper end of the stock cutting across the middle of the top cut which defines said stock cutting over a length of 5 to 10 mm, and joining the stock cutting and the scion cutting.

7. The process according to claim 1 wherein said slitting is a technique selected from group of operations consisting of saddle grafting, omega grafting, and splice grafting.

8. The process of claim 1 wherein the grafted units in step F are maintained in a development medium comprising a nutrient solution.

9. The process according to claim 8 wherein said development medium comprises a cube of rock wool.

10. The process according to claim 8 wherein said development medium comprises a pot containing a culture substrate.

11. The process according to claim 8 wherein said nutrient solution is selected from the group of solutions consisting of calcium nitrate, potassium nitrate, magnesium sulfate, ammonium nitrate, potassium hydrogen phosphate, iron citrate and a mixture of several trace elements.

12. The process according to claim 8 wherein the conditions of step G are maintained at a temperature in the range from 20° to 30° C. and at a humidity of 90 to 100%.

13. The process according to claim 10, wherein said culture substrate comprises a member selected from the group consisting of peat, pozzolana, and a mixture of peat and pozzolana.

14. The process according to claim 1, further comprising suppressing a bud on the stock of the grafted unit placed in the rooting medium.

15. The process of claim 1 wherein the rootstock line of step A and scion line of step B are grown under environmental conditions sufficient to obtain herbaceous branches with internodes of sufficient length to facilitate grafting.

16. The process of claim 1 wherein the lower end of the scion section is beveled from two sides and the upper end of the stock section is split in its middle portion and the sections are jointed to form the graft union.

17. The process of claim 1 wherein the stock shoot section contains a part of a whole leaf.

18. The process of claim 1 wherein the scion section contains a part of a whole leaf.

19. The process of claim 1 wherein the stock and scion material have the same physiological juvenile age.

20. The process of claim 1 wherein the grafted plants are substantially disease free.

21. A method of concomitantly rooting and uniting without necrosis grafted plants which are in an actively growing condition comprising the steps of:

A. selecting a rootstock line and In Vitro culturing such line to a state of being immature juvenile tender tissue in the form of shoots, said shoots being of a size wherein such shoots can be conveniently manipulated and in an actively elongating growth stage;

B. selecting a scion line and In Vitro culturing such line to a state of being immature juvenile tender tissue in the form of shoots, said shoots being of a size wherein such shoots can be conveniently manipulated and being in an actively elongating growth stage;

C. dividing the stock shoots into at least one section, wherein each section includes at least one node bearing at least a part of one leaf;

D. dividing the scion shoots into at least one section, wherein each section includes at least one node bearing at least a part of one leaf;

E. grafting said scion shoot section onto said stock section, wherein the lower end of the scion section is beveled from two sides and the upper end of the stock section is split in its middle portion and the sections are joined to form a graft union;

F. embedding at least the lower portion of the length of said stock section into a development medium comprising a nutrient solution;

G. maintaining the embedded graft unions at a temperature of from 20° to 30° C., humidity of 90% to 100%, and root growth conditions, which assure that the grafted sections will remain in an active stage of growth for a period of at least about 10 days; and H. hardening said grafted plants for ultimate transplanting.

* * * * *